Feb. 1, 1955

H. T. KRAFT 2,700,795

SECTIONAL AND COLLAPSIBLE RIM FOR
RETREAD VULCANIZER AIR BAGS

Filed Aug. 23, 1952

INVENTOR
HERMAN T. KRAFT

BY Evans & McCoy
ATTORNEYS

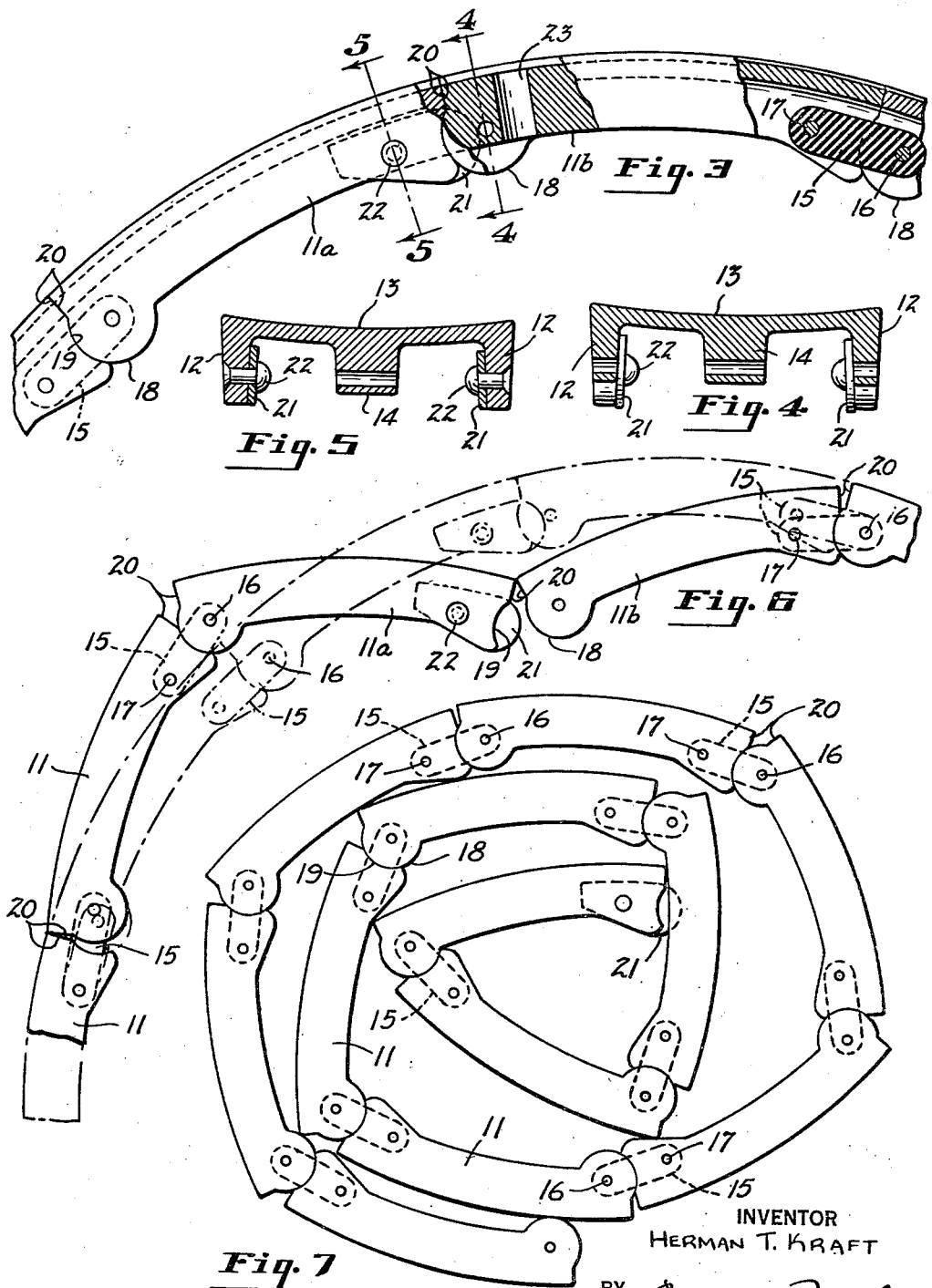

United States Patent Office 2,700,795
Patented Feb. 1, 1955

2,700,795

SECTIONAL AND COLLAPSIBLE RIM FOR RETREAD VULCANIZER AIR BAGS

Herman T. Kraft, Akron, Ohio, assignor to The General Tire and Rubber Company, Akron, Ohio, a corporation of Ohio Application August 23, 1952, Serial No. 306,005

9 Claims. (Cl. 18—18)

This invention relates to retread vulcanizing apparatus and particularly to a sectional and collapsible rim for supporting an air bag against the interior of the tread portion of a tire casing that is positioned within an annular retread vulcanizing mold.

The air bag supporting rim of the present invention is composed of a series of rigid sections preferably of identical size and shape that are pivotally connected end to end except at one breakable joint and that have end faces that abut in radial planes at every joint to rigidly hold the rim to circular form and against collapse while the air bag is inflated. The sections are so connected that parts of the rim can expand radially outwardly past the normal air bag supporting position to permit the two sections that adjoin the breakable joint to be moved into or out of bag supporting position, to lock the rim in bag supporting position, or to collapse the rim.

The pivotal connection between the sections is preferably by means of links, certain of which are extensible to permit the relative movements of the links necessary to assemble or collapse the rim. The extensible link or links can be made of elastic rubber and it is preferred to make all of the links extensible so that distortion of the circular rim necessary for assembly or collapse may be uniformly distributed about the circumference of the rim.

Objects of the invention are to provide a rim of great rigidity and strength that can be quickly and easily assembled or collapsed and to provide a collapsible rim that can be made of a series of substantially identical castings that require no machining other than the drilling of pivot holes.

Reference should be had to the accompanying drawings forming a part of this specification in which:

Fig. 3 is a fragmentary side elevation of part of the rim with a portion broken away and shown in section at the breakable joint;

Fig. 4 is a section taken on the line indicated at 4—4 in Fig. 3;

Fig. 5 is a section taken on the line indicated at 5—5 in Fig. 3;

Fig. 6 is a fragmentary side elevation of a portion of the rim showing the rim sections at the breakable joint folded inwardly to the breaking point and an adjoining section sprung outwardly past its air bag supporting position to permit the joint to be broken; and Fig. 7 is a side elevation of a section of the rim collapsed and rolled up.

Figure 1:
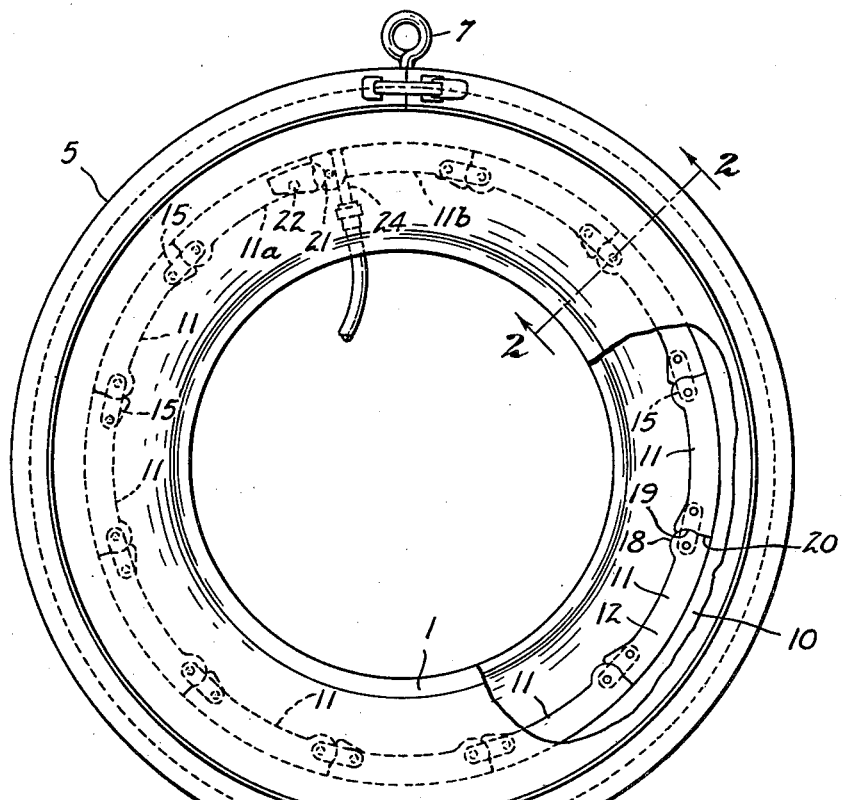
Figure 1 is a side elevation showing the rim of the present invention in place within a tire casing that is positioned in a retread vulcanizing mold.
Figure 2:
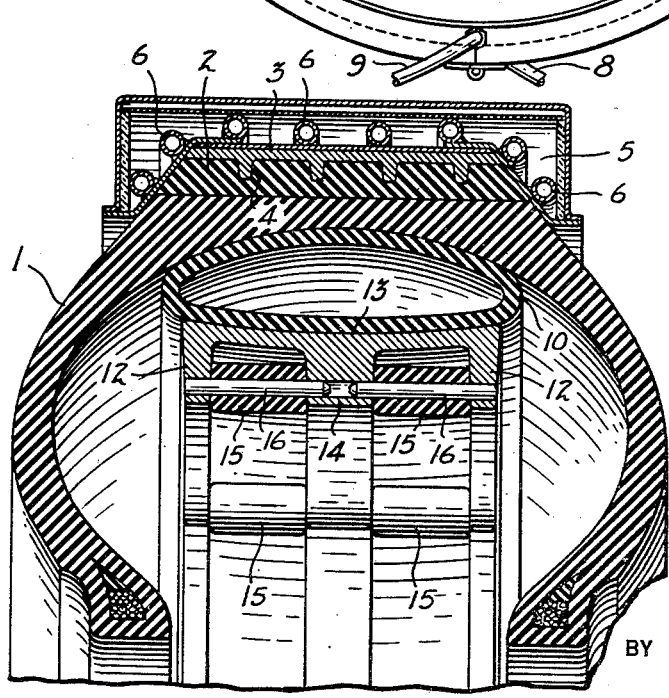
Fig. 2 is a radial section on an enlarged scale taken on the line indicated at 2—2 in Fig. 1.

In Figs. 1 and 2 of the drawings a tire casing 1 is shown with a tread portion 2 thereof positioned in a retread mold ring 3 provided with a ribbed interior face 4 that is surrounded by a heating chamber 5 in which steam coils 6 are mounted. The mold is provided with an eye bolt 9 by which it may be suspended from an overhead support and steam pressure and exhaust lines 8 and 9 are provided to circulate steam through the steam coil 6. The tread 2 of the tire casing is pressed against the interior of the ring mold 3 by means of an air bag 10 within the tire casing.

The air bag 10 is supported by a rigid rim that is positioned within the tire casing and that is composed of a series of substantially identical rigid sections 11. The sections 11 are preferably metal castings, each being channel-shaped in cross section and provided with inwardly projecting side flanges 12 that extend the full length thereof. Each of the sections 11 has an arcuate transversely concave outer face 13 and the sections when abutted end to end form a rigid rim with a circumferentially continuous circular periphery. Each of the sections 11 is formed with an internal relatively thick rib 14 midway between the side flanges 12. The sections 11 are pivotally connected by means of links 15 except at one breakable joint. The links 15 are connected to adjoining ends of the sections by pivots 16 and 17 that extend across the spaces between the side flanges and the ribs 14.

The abutting ends of the sections 11 at each joint have interfitting arcuate convex and concave bearing faces 18 and 19 formed in the ends of flanges 12 and ribs 14 that are spaced inwardly from the outer periphery of the rim and that are concentric with the pivots 16. Each section 11 is provided with radial shoulders 20 outwardly of the bearing portions 18 and 19 that abut to rigidly hold the rim to circular form. Since the pivots 16 of the links 15 are concentric with the bearing surfaces 18 and 19, the sections 11 will readily swing about the pivots 16 in a direction to separate the shoulders 20 and when collapsed the ring can be rolled up as illustrated in Fig. 7 of the drawings.

Sections 11a and 11b which abut at the breakable joint are swung inwardly as illustrated in Fig. 6 to break the joint and to collapse the rim. In order to permit this inward movement of the sections 11a and 11b, it is necessary that certain sections of the rim other than the sections 11a and 11b be so connected that they will permit movement of at least one section outwardly past its air bag supporting position to permit the inward folding of the sections 11a and 11b. Such movement may be provided by making one of the links 15 extensible so as to permit one of the sections to move outwardly as shown in the lower left-hand portion of Fig. 6. Such extensibility may be provided by making the links of elastic rubber. One elastic stretchable link permitting the relative movement of the links shown in Fig. 6 would permit breaking of the joint, but in order to uniformly distribute the distortion of the rim throughout the circumference and lessen the outward flexing of individual sections, it is preferred to make all of the links 15 of elastic rubber.

As shown in Fig. 2, two links 15 are provided between the adjoining ends of the sections 11 and these links are of a size to substantially fit between the side flanges 12 and ribs 14 so that the links 15 serve to hold the sections in circumferential alinement as well as to provide a pivotal connection between the sections.

At the breakable joint the section 11a is provided with two locking plates 21 that are secured, one to the inner side of each of the flanges 12, by rivets 22. The locking plates 21 project past the concave bearing faces 19 formed in the flanges 12 and fit between the inner faces of the flanges 12 of the section 11b to lock the sections 11a and 11b against relative lateral movements when the rim is assembled. The section 11b is provided with an opening 23 to receive a valve stem 24 of the air bag 10.

The rim is assembled within the air bag while the air bag is uninflated and the valve stem may be inserted into the opening 23 while the section 11b is near the position shown in full lines in Fig. 6. After the sections 11a and 11b have been moved from the position shown in full lines in Fig. 6 to the position shown in dotted lines to lock the rim, the air bag will be inflated and the radial pressure exerted on the sections 11 will be effectively resisted by the abutting shoulders 20 of the sections which serve to rigidly hold the rim to circular form.

After the vulcanizing operation is completed the air bag is deflated and the sections 11a and 11b are pulled inwardly to break the joint between them and permit collapse of the rim. The breaking of the joint between the sections 11a and 11b can be effected by pulling on the valve stem 24 and the air bag may be detached from the rim by freeing the valve stem 24 from the section 11b after the joint has been broken. After the rim has been collapsed it can be rolled up to provide a compact bundle as shown in Fig. 7 of the drawings.

It is to be understood that in accordance with the provisions of the patent statutes, variations and modifications of the specific devices herein shown and described may be made without departing from the spirit of the invention.

What I claim is:

1. A collapsible annular supporting rim for a retread vulcanizer air bag comprising a series of relatively short sections substantially identical in size and shape and joined end to end, said sections having outer faces that form a circumferentially continuous peripheral air bag supporting face and end faces that abut at each joint to resist collapse of the rim, the abutting end faces of said sections having interfitting convex and concave bearing portions spaced radially inwardly from said peripheral face and radial shoulder portions between said bearing portions and said peripheral face, and links connecting the adjoining ends of said sections at each joint except one, each link being pivotally connected at its ends to adjoining sections and swingable with respect to one of the sections to which it is connected about the axis of the bearing portions of the abutting end faces of said sections, certain of said links being extensible to permit at least one section to swing outwardly past its air bag supporting position to permit inward folding of said sections at said one joint.

2. A collapsible annular supporting rim for a retread vulcanizer air bag comprising a series of relatively short sections substantially identical in size and shape and joined end to end, said sections having outer faces that form a circumferentially continuous peripheral air bag supporting face and end faces that abut at each joint to resist collapse of the rim, the abutting end faces of said sections having interfitting convex and concave bearing portions spaced radially inwardly from said peripheral face and radial shoulder portions between said bearing portions and said peripheral face, and links connecting the adjoining ends of said sections at each joint except one, each link being pivotally connected at its ends to adjoining sections and swingable with respect to one of the sections to which it is connected about the axis of the bearing portions of the abutting end faces of said sections, certain of said links being formed of elastic rubber and being extensible to permit at least one section to swing outwardly past its air bag supporting position to permit inward folding of the sections at said one joint.

3. A collapsible annular supporting rim for a retread vulcanizer air bag comprising a series of relatively short sections substantially identical in size and shape and joined end to end, said sections having outer faces that form a circumferentially continuous peripheral air bag supporting face and end faces that abut at each joint to resist collapse of the rim, the abutting end faces of said sections having interfitting convex and concave bearing portions spaced radially inwardly from said peripheral face and radial shoulder portions between said bearing portions and said peripheral face, and links connecting the adjoining ends of said sections at each joint except one, each link being pivotally connected at its ends to adjoining sections and being elastic and extensible to permit outward flexing of portions of the rim adjacent said one joint past its air bag supporting position to permit the said one joint to be broken by inward movement of the sections at said one joint.

4. A collapsible annular supporting rim for a retread vulcanizer air bag comprising a series of relatively short sections substantially identical in size and shape and joined end to end, said sections having outer faces that form a circumferentially continuous peripheral air bag supporting face and end faces that abut at each joint to resist collapse of the rim, the abutting end faces of said sections having interfitting convex and concave bearing portions spaced radially inwardly from said peripheral face and radial shoulder portions between said bearing portions and said peripheral face, and links connecting the adjoining ends of said sections at each joint except one, each link being pivotally connected at its ends to adjoining sections and being extensible and formed of elastic rubber.

5. A collapsible annular supporting rim for a retread vulcanizer air bag comprising a series of substantially identical cast metal sections joined end to end, each section being channel shaped in cross section and having inwardly projecting flanges, said sections having outer faces that provide a circumferentially continuous peripheral air bag supporting face and end faces that abut at each joint to resist collapse of the rim, the abutting end faces of said sections at each joint having interfitting concave and convex arcuate bearing portions formed in said flanges and spaced radially inwardly from said peripheral face and radial shoulder portions between said bearing portions and said peripheral face, and links disposed between the flanges and connecting said sections at each joint except one, each link being pivoted at its ends to adjoining sections and to one of said sections to swing about an axis concentric with the bearing portions of the end faces of the sections which it connects, certain of said links providing an extensible connection between its pivots to permit at least one of said sections to swing outwardly past its air bag supporting position to permit inward folding of said sections at said one joint.

6. A collapsible annular supporting rim for a retread vulcanizer air bag comprising a series of substantially identical cast metal sections joined end to end, each section being channel shaped in cross section and having inwardly projecting flanges, said sections having outer faces that provide a circumferentially continuous peripheral air bag supporting face and end faces that abut at each joint to resist collapse of the rim, the abutting end faces of said sections at each joint having interfitting concave and convex arcuate bearing portions formed in said flanges and spaced radially inwardly from said peripheral face and radial shoulder portions between said bearing portions and said peripheral face, and links disposed between the flanges and connecting said sections at each joint except one, each link being pivoted at its ends to adjoining sections and to one of said sections to swing about an axis concentric with the bearing portions of the end faces of the sections which it connects, said links being formed of elastic rubber and being extensible under tension to permit flexing of the portions of the rim outwardly past air bag supporting position whereby the sections at said one joint can be folded inwardly.

7. A sectional collapsible annular supporting rim for a retread vulcanizer air bag comprising a series of substantially identical cast metal sections joined end to end and having radially disposed abutting end faces, each section being channel shaped in cross section and having inwardly projecting side flanges and an inwardly projecting rib midway between said flanges, pivot pins extending transversely across the space between said flanges and rib and a pair of elastic rubber links connecting adjoining ends of said sections at each joint of the rim except one, said links connecting the pivot pins at adjoining ends of the sections and disposed between said rib and said flanges.

8. A sectional collapsible annular supporting rim for a retread vulcanizer air bag comprising a series of substantially identical cast metal sections joined end to end and having radially disposed abutting end faces, each section being channel shaped in cross section and having inwardly projecting side flanges and an inwardly projecting rib midway between said flanges, pivot pins extending transversely across the space between said flanges and rib and a pair of elastic rubber links connecting adjoining ends of said sections at each joint of the rim except one breakable joint, said links having end portions that fit between said side flanges and said rib, one of the sections adjoining said breakable joint having locking plates attached to the inner sides of its flanges and projecting beyond the end of the section into the space between the flanges of the adjoining section.

9. A collapsible annular supporting rim for a retread vulcanizer air bag comprising a series of relatively short arcuate sections joined end to end, said sections having outer faces that form a circumferentially continuous peripheral air bag supporting face and end faces that abut at each joint to resist collapse of the rim, the abutting end faces of said sections having interfitting convex and concave bearing portions spaced radially inwardly from said peripheral face and radial shoulder portions between said bearing portions and said peripheral face, and links connecting said arcuate sections, each link being pivotally connected to one of said arcuate sections and swingable with respect to one of the sections to which it is connected about the axis of the bearing portions of the abutting end faces of said sections, certain of said links being elastic and extensible to permit at least one section to swing outwardly past its air bag supporting position to permit inward folding of said sections.

References Cited in the file of this patent

UNITED STATES PATENTS

| | | |
|---|---|---|
| 1,589,105 | Calusinski | June 15, 1926 |
| 1,675,371 | Miller | July 3, 1928 |
| 2,345,172 | Bacon | Mar. 28, 1944 |
| 2,526,129 | Groesbeck et al. | Oct. 17, 1950 |